(12) United States Patent
Wojcik

(10) Patent No.: US 6,508,958 B1
(45) Date of Patent: Jan. 21, 2003

(54) COMPOSITION AND PROCESS FOR INHIBITING CORROSION OF METALLIC SUBSTRATES

(76) Inventor: Gerald Wojcik, 429 Prospect St., Thomaston, CT (US) 06787

( * ) Notice: Subject to any disclaimer, the term of this patent is extended or adjusted under 35 U.S.C. 154(b) by 0 days.

(21) Appl. No.: 09/906,370

(22) Filed: Jul. 16, 2001

(51) Int. Cl.[7] .................. C09K 15/06; C09K 15/16; C09K 15/32; C23F 11/00; C08B 37/08

(52) U.S. Cl. .................. 252/389.21; 252/389.22; 252/391; 252/400.21; 252/402; 106/14.12; 106/14.16; 106/14.37; 427/388.2; 427/385.5; 536/20

(58) Field of Search .................. 252/389.2, 389.21, 252/389.23, 389.24, 390, 391, 395, 400.2, 400.21, 400.22, 400.23, 400.24, 402, 405, 406; 536/20, 124; 427/334, 385.5, 388.2; 106/14.12, 14.16, 14.37

(56) References Cited

U.S. PATENT DOCUMENTS

| | | | |
|---|---|---|---|
| 4,134,412 A | * | 1/1979 | Gross et al. .................. 132/7 |
| 4,853,429 A | * | 8/1989 | Sannan et al. .................. 524/29 |
| 4,964,894 A | | 10/1990 | Freepons .................. 77/88 |
| 4,996,307 A | * | 2/1991 | Itoi et al. .................. 536/20 |
| 5,328,939 A | * | 7/1994 | Smith .................. 521/187 |
| 5,900,462 A | | 5/1999 | Tanaka |
| 5,900,479 A | | 5/1999 | Glasser et al. |
| 5,977,330 A | | 11/1999 | Lohmann et al. |
| 6,139,688 A | | 10/2000 | Ramachandran |
| 6,150,033 A | | 11/2000 | Mosser et al. |
| 6,165,378 A | | 12/2000 | Maruno et al. |
| 6,174,999 B1 | | 1/2001 | Miller et al. |
| 6,187,902 B1 | | 2/2001 | Yanase et al. |
| 6,194,033 B1 | | 2/2001 | Shimizu et al. |
| 6,207,772 B1 | | 3/2001 | Hatsuda et al. |

FOREIGN PATENT DOCUMENTS

| | | | |
|---|---|---|---|
| JP | 59-52503 | * | 3/1984 |
| JP | 63-2924 | * | 1/1988 |
| JP | 63-72702 | * | 4/1988 |
| JP | 5-23106 | * | 2/1993 |
| JP | 6-113802 | * | 4/1994 |
| JP | 8-12514 | * | 1/1996 |

OTHER PUBLICATIONS

Derwent–Acc–No: 1988–045803, 1988.*
Derwent–Acc–No: 1994–172707.*
Derwent–Acc–No: 1996–112584.*
JP Absract Pub–No: JP 363072702A, 1988.*
Derwent–Acc–No: 1993–079381.*
JP Pub–No: JP 359052503A, 1984.*
Poly(itaconic acid)–modified chitosan coatings for mitigating corrosion of aluminum substrates, T. Sugama et al., Progress in Organic Coatings 38 (2000 79–87).

* cited by examiner

Primary Examiner—Joseph D. Anthony
(74) Attorney, Agent, or Firm—Carmody & Torrance LLP

(57) ABSTRACT

A composition and process for inhibiting the corrosion of metallic substrates is revealed. The process utilizes an aqueous treatment solution comprising chitosan which has been reacted with an acid selected from the group consisting of phosphonic acids, carboxylic acids and mixtures thereof. The composition and process are particularly useful in providing corrosion protection for aluminum and aluminum alloys.

15 Claims, No Drawings

COMPOSITION AND PROCESS FOR INHIBITING CORROSION OF METALLIC SUBSTRATES

FIELD OF THE INVENTION

The present invention relates to compositions and processes for providing corrosion protection for metal substrates, particularly substrates comprised of aluminum or aluminum alloys, using treatment solutions comprising chitosan which has been reacted with selected acids.

BACKGROUND OF THE INVENTION

Many metals are susceptible to corrosion. In this regard, atmospheric corrosion is of particular concern. Corrosion may affect the performance and/or appearance of the metals affected, and the products produced therefrom. In addition, when polymer coatings such as paints, adhesives or sealants are applied to the metal, corrosion of the underlying metal may cause loss of adhesion between the polymer coating and the base metal.

Aluminum and aluminum alloys frequently require corrosion protection and improvements in adhesion between the base aluminum (or aluminum alloys) and subsequent polymer coatings. Aluminum alloys, in particular, can be susceptible to corrosion since the alloying elements used to improve the aluminum's mechanical properties may decrease corrosion resistance.

Specifications for testing the effectiveness of the corrosion inhibition and adhesion promotion of various treatments have been established. Examples of such specifications include ASTM standard D3359-87, ASTM standard B117 and Military specification MIL-C-5541D.

Prior art techniques for improving corrosion resistance of metals widely employ the use of chromate conversion coatings to passivate the surface. Such chromate treatments are undesirable however, because the chromium used is highly toxic, carcinogenic, and environmentally undesirable. Various attempts have been made to reduce the toxicity of these chromium treatments, including the use of trivalent chromium in place of the more toxic hexavalent chromium, but these attempts have proven less than completely successful.

Phosphate conversion coatings are also used, but generally provide substantially less corrosion protection than is typically desired. More recently the use of treatment compositions comprising silicates and/or silanes has been proposed. However, these treatments have also fallen short of corrosion protection expectations in many cases.

As a result, there remains a real need for non-toxic treatment solutions which are safe to handle and provide the level of corrosion protection typically demanded in a variety of applications. The composition and process of the current invention are meant to address the foregoing needs.

Thus it is an object of this invention to provide an improved method of inhibiting corrosion of metals, especially aluminum and aluminum alloys, which is simple to employ, cost effective and environmentally friendly. It is a further object of this invention to provide a treatment for metals which improves the adhesion of subsequent organic coatings to the metal while at the same time improving the corrosion resistance of the metal.

SUMMARY OF THE INVENTION

The foregoing objectives can be accomplished by treating a metal, particularly aluminum or aluminum alloys, with a treatment composition which comprises an aqueous solution of chitosan which has been reacted with an acid selected from the group consisting of phosphonic acids, carboxylic acids and mixtures of the foregoing. The treatment composition is applied directly to a clean metal surface by immersion, spray, flood or other means of direct contact. The treatment solution is preferably applied to the metal at a temperature of from 70° F. to 150° F. Preferably the treatment solution is acidic enough to solubilize the acid modified chitosan.

Preferably, the metal surface is cleaned, deoxidized, and/or etched prior to treatment with the chitosan based treatment solution. A variety of known cleaners, deoxidizers and/or etchants may be employed for this purpose, with the appropriate choice being made with the specific metal surface to be prepared in mind.

Once the chitosan treatment is applied to the metal surface the treated surface should be allowed to dry. Drying may occur at room temperature or upon baking the surfaces at temperatures which preferably do not exceed about 200° C.

The compositions and processes of this invention are particularly suitable for treating aluminum and aluminum alloys. The inventor has found that treating aluminum or aluminum alloys with the acid modified chitosan solution of this invention provides both increased corrosion resistance and enhanced adhesion of subsequent organic coatings to the treatment surfaces.

DETAILED DESCRIPTION OF THE INVENTION

Chitosan is the product of deacetylation of chitin. Generally chitosan is an amorphous solid which is soluble in aqueous solutions with pH less than about 6. Chitosan is of nearly identical structure to chitin, except that it is de-acetylated. The chemical structure of chitosan is as follows:

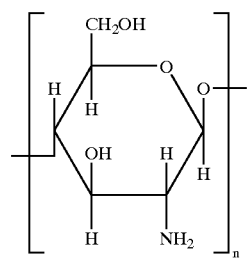

where n represents the number of repeating units in the polymer chain. Because chitosan is more easily solubilized than chitin, chitosan is preferred for use in the process of the invention. Chitosan is also a low cost polymer, since its source, chitin, comes from the shells of marine crustaceans such as shrimp, crabs and lobsters.

The inventor herein has discovered that although aqueous solutions of chitosan, itself, do not adequately function as corrosion prevention treatments for metallic surfaces, certain modified chitosans do provide desirable levels of corrosion protection for metals. Specifically the inventor herein has discovered that aqueous solutions of chitosan which has been reacted with an acid selected from the group consisting of phosphonic acids, carboxylic acids and mixtures thereof provide an excellent corrosion protection treatment for metals. Polyphosphonic acids (i.e. phosphonic acids having two or more phosphonic acid groups) and polycarboxylic acids (i.e. carboxylic acids having two or more carboxylic acid groups) are particularly preferred in creating the modified chitosan of this invention and polyphosphonic acids are most preferred.

Without being bound by theory, it is believed that when the phosphonic and/or carboxylic acids are reacted with the chitosan, they tend to form amide bonds with the glucosamine ring structure, thereby bridging between chitosan strands. The resulting modified chitosan structure is more hydrophobic in nature than the unmodified chitosan structure, thereby reducing the permeability of the modified chitosan matrix. It is believed that this reduction in permeability of the modified chitosan matrix provides better corrosion protection for the treated metal.

As noted, the modified chitosan is created by reacting chitosan with an acid selected from the group consisting of phosphonic acids, carboxylic acids and mixtures of the foregoing, with polyphosphonic acids and polycarboxylic acids preferred, and with polyphosphonic acids being most preferred. Preferably, the foregoing acids are reacted with the chitosan at elevated temperatures. One method of preparing the treatment solution of this invention is as follows:

1) Adjust the pH of distilled water to less than 1 with a mineral acid such as hydrochloric acid.
2) Dissolve chitosan in the acidified distilled water with stirring and heat.
3) Create a concentrated solution of an acid selected from the group consisting of phosphonic acids, carboxylic acids and mixtures thereof, in distilled water.
4) Add the concentrated solution from step 3 to the chitosan solution from step 2 with stirring and heat. Preferably the combined solution is heated to at least 150–190° F. and held there for about one hour then allow to cool.
5) Preferably filter the resulting treatment solution.

The acids used to react with and modify the chitosan should be selected from the group consisting of phosphonic acids, carboxylic acids and mixtures thereof. The inventor has found polyphosphonic acids and polycarboxylic acids (i.e. acids containing two or more phosphonic and/or carboxylic acid groups per molecule), to be particularly preferred, with polyphosphonic acids being most preferred. The weight ratio of reactant acid to chitosan should be kept in the range of between 10%/90% to 90%/10% and is preferably from 20% to 80%. It is also particularly preferred for the reactant acids to have mercapto or other similar sulfur bearing groups in addition to the phosphonic and/or carboxylic acid groups. Examples of suitable phosphonic acids include aminotri(methylenephosphonic) acid and amino di(methylene phosphonic) acid. Examples of suitable carboxylic acids include mercapto-succinic acid, sebacic acid, and adipic acid. Polyacids which are either insoluble or very slightly soluble in water are preferred, since they are believed to synergistically increase the hydrophobic nature of the coating produced.

Chitosan and the modified chitosans of this invention are only very sparingly soluble in water but their solubility increases in acidified water. As a result, the modified chitosans of this invention should be dissolved into an aqueous solution which preferably has pH adjusted to less than about 1, preferably with a mineral acid such as hydrochloric acid. The concentration of the modified chitosan in the treatment solution should range from about 1 to 20 grams per liter and is preferably from about 5 to 10 grams per liter.

In addition to the water, the mineral acid and the modified chitosan, the treatment solution may also contain other additives such as solvents, surfactants, thickeners and other similar additives. Solvents and/or surfactants may be used to enhance the cleaning properties of the treatment solution and to improve the overall contact between the treatment solution and the metal surface being treated, thereby increasing the uniformity of the coating created. In this regard, 2-butoxyethanol is a preferred solvent. Solvents such as 2-butoxyethanol may also be used to solubilize or disperse the reactant acids in the aqueous solution.

Before application of the treatment solution to the metal surface, it is preferred to clean, deoxidize and/or etch the metal surface so that the uniformity and adhesion of the subsequently formed corrosion protection coating is enhanced. A variety of known cleaners, deoxidizers and/or etchants may be employed for this purpose, with appropriate choice being made with the specific metal surface to be prepared in mind. For aluminum and aluminum alloy surfaces the inventor has found Isoprep 49L and Isoprep 184, available from MacDermid, Incorporated of Waterbury, Conn., to be a particularly effective pre-treatment for cleaning and deoxidizing the surfaces prior to treatment with the process of this invention.

The treatment solution of this invention is applied directly to a clean metal surface by immersion, spray, flood or other means of direct contact. The solution is preferably applied to the metal at a temperature of from 70° F. to 150° F. Contact time between the treatment solution and the metal can range from 30 seconds to 5 minutes and is dependent upon the temperature of the treatment solution and the method of application.

Once the treatment solution is applied to the metal surface, the treated surface should be allowed to dry. Drying may occur at room temperature, or upon baking at temperatures which preferably do not exceed about 200° C.

The compositions and processes of this invention may be utilized on a variety of ferrous and non-ferrous metal surfaces, however, they are particularly suited to treating aluminum and aluminum alloys. The inventor has found that treating aluminum and aluminum alloys with the treatment solution of this invention provides both increased corrosion resistance and enhanced adhesion of subsequent organic coatings, such as paints, to the treated surfaces.

The following examples. further illustrate the composition and process of the invention, but should not be taken as limiting in any manner.

EXAMPLE I

A treatment composition in accordance with this invention was prepared with the following composition:

| Component | Concentration (% by weight) |
| --- | --- |
| Hydrochloric Acid | 0.50 |
| Chitosan | 0.35 |
| Aminotri(methylenephosphonic) acid | 0.15 |
| Water | 99.00 |

The foregoing treatment composition was prepared using the following procedure:

1) Place 100 ml of distilled water in a 250 ml beaker along with a stirbar. Begin stirring and add 1.0 gram HCL.
2) Add 0.7 g of chitosan and heat to 190° F. Allow to stir for 3 hours while covered with a watchglass.
3) In a separate beaker with stirbar, place 100 ml of distilled water and 0.3 grams of Aminotri (methylenephosphonic) acid and stir until well mixed.

4) Add the contents of the second beaker to that of the first. Cover with a watchglass, heat to 190° F. and stir. Hold at temperature for one hour and then allow to cool to room temperature. Add back water to bring to original volume.

5) Once cooled, filter with a Buchner funnel using number 4 filter paper.

An aluminum substrate was sequentially pre-treated, in accordance with the manufacturer's instructions, with Mac-Dermid Isoprep 49L and Isoprep 184 in order to clean and deoxidize the surface. The surface was then rinsed with water.

The aluminum substrate was then immersed in the treatment solution of 75° F. for one minute. The substrate was removed from the treatment solution and dried at 175° C. for 30 minutes.

The treated aluminum substrate was then exposed to salt spray exposure. The aluminum substrate remained for 360 hours before corrosion was apparent.

EXAMPLE II

A treatment composition in accordance with this invention was prepared with the following composition:

| Component | Concentration (% by weight) |
| --- | --- |
| Hydrochloric Acid | 0.50 |
| Chitosan | 0.35 |
| Mercaptosuccinic Acid | 0.15 |
| Water | 99.00 |

The foregoing treatment composition was prepared using the following procedure:

1) Place 100 ml of distilled water in a 250 ml beaker along with a stirbar. Begin stirring and add 1.0 gram HCL.
2) Add 0.7 g of chitosan and heat to 190° F. Allow to stir for 3 hours while covered with a watchglass.
3) In a separate beaker with stirbar, place 100 ml of distilled water and 0.3 grams of mercaptosuccinic acid and stir until well mixed.
4) Add the contents of the second beaker to that of the first. Cover with a watchglass, heat to 190° F. and stir. Hold at temperature for one hour and allow to cool to room temperature. Add back water to bring to original volume.
5) Once cooled, filter with a Buchner funnel using number 4 filter paper.

An aluminum substrate was sequentially pre-treated, in accordance with the manufacturer's instructions, with Mac-Dermid Isoprep 49L and Isoprep 184 in order to clean and deoxidize the surface. The surface was then rinsed with water.

The aluminum substrate was then immersed in the treatment solution at 75° F. for 1 minute. The substrate was then removed from the treatment solution and dried at 175° C. for 30 minutes.

The treated aluminum substrate was then exposed to salt spray exposure. The aluminum substrate remained for 456 hours before corrosion was apparent.

EXAMPLE III

A treatment composition in accordance with this invention was prepared with the following composition:

| Component | Concentration (% by weight) |
| --- | --- |
| Hydrochloric Acid | 0.50 |
| Chitosan | 0.35 |
| Sebacic acid acid | 0.15 |
| 2-butoxyethanol | 7.50 |
| Water | 91.50 |

The foregoing treatment composition was prepared using the following procedure:

1) Place 100 ml of distilled water in a 250 ml beaker along with a stirbar. Begin stirring and add 1.0 gram HCL.
2) Add 0.7 g of chitosan and heat to 190° F. Allow to stir for 3 hours while covered with a watchglass.
3) In a separate beaker with stirbar, place 100 ml of distilled water and 15 grams of 2-butoxyethanol and allow to mix well. Add 0.3 grams of sebacic acid acid and stir until well mixed.
4) Add the contents of the second beaker to that of the first. Cover with a watchglass, heat to 190° F. and stir. Hold at temperature for one hour and allow to cool to room temperature. Add back water to bring to original volume.
5) Once cooled, filter with a Buchner funnel using number 4 filter paper.

An aluminum substrate was sequentially pre-treated, in accordance with the manufacturer's instructions with Mac-Dermid Isoprep 49L and Isoprep 184 in order to clean and deoxidize the surface. The surface was then rinsed with water.

The aluminum substrate was then immersed in the treatment solution at 75° F. for 1 minute. The substrate was then removed from the treatment solution and dried at 175° F. for 30 minutes.

The treated aluminum substrate was then exposed to salt spray exposure. The aluminum substrate remained for 384 hours before corrosion was apparent.

EXAMPLE IV

A treatment composition in accordance with this invention was prepared with the following composition:

| Component | Concentration (% by weight) |
| --- | --- |
| Hydrochloric Acid | 0.50 |
| Chitosan | 0.35 |
| Adipic acid | 0.15 |
| 2-butoxyethanol | 7.50 |
| Water | 91.50 |

The foregoing treatment composition was prepared using the following procedure:

1) Place 100 ml of distilled water in a 250 ml beaker along with a stirbar. Begin stirring and add 1.0 gram HCL.
2) Add 0.7 g of chitosan and heat to 190° F. Allow to stir for 3 hours while covered with a watchglass.
3) In a separate beaker with stirbar, place 100 ml of distilled water and 15 grams of 2-butoxyethanol and allow to mix well. Add 0.3 grams of adipic acid and stir until well mixed.
4) Add the contents of the second beaker to that of the first. Cover with a watchglass, heat to 190° F. and stir. Hold at temperature for one hour and allow to cool to room temperature. Add back water to bring to original volume.

5) Once cooled, filter with a Buchner funnel using number 4 filter paper.

An aluminum substrate was sequentially pre-treated, in accordance with the manufacture's instructions, with Mac-Dermid Isoprep 49L and Isoprep 184 in order to clean and deoxidize the surface. The surface was then rinsed with water.

The aluminum substrate was then immersed in the treatment solution at 75° F. for 1 minute. The substrate was then removed from the treatment solution and dried at 175° F. for 30 minutes.

The treated aluminum substrate was then exposed to salt spray exposure. The aluminum substrate remained for 288 hours before corrosion was apparent.

What is claimed is:

1. A process for providing corrosion protection to metal surfaces, which process comprises contacting the metal surfaces with an aqueous composition comprising chitosan which has been reacted with an acid selected from the group consisting of phosphonic acids, polyphosphonic acids, and mixtures of the foregoing wherein the weight ratio of reactant acid to chitosan is in the range of 10%/90% to 90%/10%.

2. A process according to claim 1 wherein the metal surfaces comprise aluminum or aluminum alloys.

3. A process according to claim 1 wherein the weight ratio of acid to chitosan is from 20% to 80%.

4. A process according to claim 1 wherein the composition also comprises 2-butoxyethanol.

5. A process according to claim 1 wherein the acid is selected from the group consisting of aminotri (methylenephosphonic) acid, aminodi(methylene phosphonic) acid, and mixtures of the foregoing.

6. A process according to claim 5 wherein the metal surfaces comprise aluminum or aluminum alloys.

7. A process according to claim 1 wherein the composition also comprises a material selected form the group consisting of organic solvents, surfactants, thickeners and combinations of the foregoing.

8. A process according to claim 7 wherein the metal surfaces comprise aluminum or aluminum alloys.

9. A process according to claim 1 wherein the acid has two or more groups within its molecular structure selected from the group consisting of phosphonic acid groups.

10. A process according to claim 9 wherein the metal surfaces comprise aluminum or aluminum alloys.

11. A process according to claim 9 wherein the composition also comprises a material selected from the group consisting of organic solvents, surfactants, thickeners and combinations of the foregoing.

12. A process according to claim 9 wherein the weight ratio of acid to chitosan is from 20% to 80%.

13. A process according to claim 12 herein the metal surfaces comprise aluminum or aluminum alloys.

14. A process according to claim 9 wherein the acid is selected from the group consisting of aminotri (methylenephosphonic) acid, aminodi(methylene phosphonic) acid, and mixtures of the foregoing.

15. A process according to claim 14 wherein the metal surfaces comprise aluminum or aluminum alloys.

* * * * *